(12) United States Patent
Zheng et al.

(10) Patent No.: US 9,961,724 B1
(45) Date of Patent: May 1, 2018

(54) PHASE-CUT DIMMABLE POWER SUPPLY WITH HIGH POWER FACTOR

(71) Applicant: Zhuhai Shengchang Electronics Co., Ltd., Zhuhai (CN)

(72) Inventors: Dehua Zheng, Zhuhai (CN); Xianyun Zhao, Zhuhai (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 0 days. days.

(21) Appl. No.: 15/680,214

(22) Filed: Aug. 18, 2017

(30) Foreign Application Priority Data

Jan. 19, 2017 (CN) .................. 2017 1 00398760
Jan. 19, 2017 (CN) .................. 2017 2 00661802 U

(51) Int. Cl.
*H05B 37/02* (2006.01)
*H05B 33/08* (2006.01)

(52) U.S. Cl.
CPC ..... *H05B 33/0809* (2013.01); *H05B 33/0815* (2013.01); *H05B 33/0818* (2013.01); *H05B 33/0842* (2013.01); *H05B 33/0845* (2013.01)

(58) Field of Classification Search
CPC ............ H05B 33/0815; H05B 33/0818; H05B 33/0842; H05B 33/0845
USPC ........................................ 315/294, 297, 307
See application file for complete search history.

(56) References Cited

U.S. PATENT DOCUMENTS

| | | | | |
|---|---|---|---|---|
| 7,978,485 | B2 * | 7/2011 | Stamm | H02M 7/15 363/44 |
| 9,210,744 | B2 * | 12/2015 | Del Carmen, Jr. | H05B 33/0809 |
| 2011/0285301 | A1 * | 11/2011 | Kuang | H05B 33/0809 315/200 R |
| 2012/0262084 | A1 * | 10/2012 | Liu | H05B 33/0815 315/250 |
| 2013/0057169 | A1 * | 3/2013 | Harel | H05B 33/0815 315/200 R |
| 2014/0021874 | A1 * | 1/2014 | Chen | H05B 33/0815 315/200 R |
| 2014/0265935 | A1 * | 9/2014 | Sadwick | H05B 33/0815 315/307 |

* cited by examiner

*Primary Examiner* — Tung X Le
(74) *Attorney, Agent, or Firm* — Gokalp Bayramoglu

(57) ABSTRACT

The present invention discloses a high power factor phase-cut dimming power supply system, which includes an alternating current power supply, a phase cutting dimmer, a high power factor phase-cut dimming power supply, an LED lamp, or an LED light. The high power factor phase-cut dimming power supply includes an anti-interference circuit that corresponds to and adaptively connect with each other, an active power factor correction circuit, a power conversion circuit, a dimmer current maintaining circuit, a signal conversion circuit, a photoelectric coupler, a PWM signal amplifying circuit and a field effect transistor. The present invention provides a high power factor phase-cut dimming power supply. It has advantages of a high power factor, a load power without any limitation, a high efficiency, an output power as high as several hundred watts. It can be widely used in the field of high power factor phase-cut dimming power supply.

3 Claims, 2 Drawing Sheets

PHASE-CUT DIMMABLE POWER SUPPLY WITH HIGH POWER FACTOR

CROSS REFERENCE TO RELATED APPLICATIONS

This application is based upon and claims priority to Chinese Patent Application No. 2017200661802 (CN), filed on Jan. 19, 2017, and No. 2017100398760 (CN), filed on Jan. 19, 2017, the entire contents of which are incorporated herein by reference.

TECHNICAL FILED

The present invention relates to a phase-cut dimming power supply, particularly relating to a high power factor phase-cut dimming power supply.

BACKGROUND

The phase-cut dimming mode has some advantages. It is convenient for users to install and wire the circuit. Further, it is easy to convert the lighting circuit wiring in the old building into a lighting solution with a dimming function. Hence, the phase-cut dimming mode is more and more widely used. However, the current phase-cut dimming power supply generally sacrifices a power factor or efficiency to satisfy the good dimming effect and improve the compatibility with the dimmer. Currently available solution uses a unipolar PFC flyback switching power supply to achieve dimming by adjusting a limited power. Though it can obtain a high power factor, the efficiency is low, which generally provides only 80% conversion effect. Besides, the load range is limited. When the load power is lower than 70% of the rated output power of the power supply, the dimming effect becomes worse. When LED lamps of different colors are connected at the same time, the dimming is unsynchronized. This topological structure determines that the currently available solution is not suitable for the dimming power supply with a power over 100 W, especially not suitable for the phase-cut dimming power supply. Some other solutions realize dimming using a flyback switching power supply or a forward switching power supply without a power factor correction circuit, in a PWM control output mode. Though the efficiency of this mode is a little higher than the efficiency of the phase-cut dimming power supply using the unipolar PFC flyback switching power supply and there is no limit for the load, the power factor is low due to a missing power factor correction circuit. The power factor generally ranges from 0.5-0.8, and the harmonic content is extremely high and is over 100%. Thus, the electric network has high interference. Moreover, the input peak current is high, and the requirement for the rated power or rated current of the dimmer is thus high. Besides, there are some phase-cut dimming power supplies using an electronic transformer. The deficiencies of the phase-cut dimming power supply are that the ripple is extremely large since the output is not filtered, and the voltage regulation and load regulation are both high. Hence, the damage to the LED lamp beads is extremely high when it is used in LED lamps, which reduces the lifetime of the LED lamp beads, and has a significantly obvious stroboscopic issue.

As above, the high power factor phase-cut dimming power supply in the prior art has disadvantages that the load power is limited, dimming is unsynchronized when various LED lamps with different colors are connected, the efficiency is low, and the output power is low and generally lower than 100 W. Furthermore, the phase-cut dimming power supply without a power factor correction has disadvantages of low power factor, high harmonic content, high interference with the electric network, high requirement for the dimmer.

It is to be noted that the phase-cut dimmer has various types, connection configurations and other names, such as a silicon-controlled dimmer, a leading edge dimmer and a trailing edge dimmer, a tangent dimmer or an anti-tangent dimmer. The LED lamp or LED light can also have many forms and types, and can be used individually or in combination.

SUMMARY OF THE INVENTION

The problem that the present invention intends to solve is to overcome the defects of the prior art, and provide a high power factor phase-cut dimming power supply. It has advantages of providing high power factor, a load power without any limitation, high efficiency, an output power as high as several hundred watts (or even kilowatts), low harmonic content, high compatibility with the phase-cut dimmer or the silicon-controlled dimmer, and small ripple.

The technical solutions of the present invention are as below: A high power factor phase-cut dimming power supply system, including an alternating current power supply, a phase-cut dimmer, a high power factor phase-cut dimming power supply, an LED lamp, or an LED light. The input terminal of the phase-cut dimmer is connected to the alternating current power supply. The output terminal of the phase-cut dimmer is connected to the input terminal of the high power factor phase-cut dimming power supply. The output terminal of the high power factor phase-cut dimming power supply is connected to the LED lamp, or the LED light. The high power factor phase-cut dimming power supply includes an anti-interference circuit, an active power factor correction circuit, a power conversion circuit, a dimmer current maintaining circuit, a signal conversion circuit, a photoelectric coupler, a PWM signal amplifying circuit and a field effect transistor, and the anti-interference circuit, the active power factor correction circuit, the power conversion circuit, the dimmer current maintaining circuit, a signal conversion circuit, the photoelectric coupler, the PWM signal amplifying circuit and the field effect transistor adaptively connect with each other. The input terminal L of the high power factor phase-cut dimming power supply is connected to the output terminal of the phase-cut dimmer. The input terminal of the phase-cut dimmer is connected to the terminal L of the live wire of the alternating current power supply. The input terminal N of the high power factor phase-cut dimming power supply is connected to the terminal N of the zero line of the alternating current power supply. The output terminal of the high power factor phase-cut dimming power supply is connected to the LED lamp or the LED light. The anti-interference circuit is connected to the input terminals L and N of the high power factor phase-cut dimming power supply. The anti-interference circuit is connected to the active power factor correction circuit, the dimmer current maintaining circuit, and the signal conversion circuit. The active power factor correction circuit is connected to the power conversion circuit. The signal conversion circuit is connected to the photoelectric coupler. The photoelectric coupler is connected to the PWM signal amplifying circuit. The PWM signal amplifying circuit is connected to a gate terminal of the field effect transistor. The positive terminal of the output of the power conversion circuit is the positive terminal of the output of the high power factor phase-cut dimming power supply. The negative terminal of the output of the power conversion circuit is connected to the source terminal of the field effect transistor. A drain terminal of the field effect transistor is the negative terminal of the output of the high power factor phase-cut dimming power supply.

The active power factor correction circuit has functions of increasing power factor, reducing the interference of harmonic content to the electric network, and supplying working voltage to the power conversion circuit. At the same time, the active power factor correction circuit works with the power conversion circuit to realize high power and small ripple.

The output of the high power factor phase-cut dimming power supply works in a PWM control dimming mode. In this mode, the dimming effect is not affected by the load power. This mode can also achieve synchronous dimming when various LED lamps with different colors are connected. This mode can also improve the compatibility with the dimmer, because a signal dimmer current maintaining circuit is provided.

The beneficial effects of the present invention are as below: The present invention includes the alternating current power supply, the phase-cut dimmer, the high power factor phase-cut dimming power supply, the LED lamp or LED light. The input terminal of the phase-cut dimmer is connected to the alternating current power supply. The output terminal of the phase-cut dimmer is connected to the input terminal of the high power factor phase-cut dimming power supply. The output terminal of the high power factor phase-cut dimming power supply is connected to the LED lamp, or the LED light. The high power factor phase-cut dimming power supply includes an anti-interference circuit, an active power factor correction circuit, a power conversion circuit, a dimmer current maintaining circuit, a signal conversion circuit, a photoelectric coupler, a PWM signal amplifying circuit and a field effect transistor, and the anti-interference circuit, the active power factor correction circuit, the power conversion circuit, the dimmer current maintaining circuit, a signal conversion circuit, the photoelectric coupler, the PWM signal amplifying circuit and the field effect transistor adaptively connect with each other. The input terminal L of the high power factor phase-cut dimming power supply is connected to the output terminal of the phase-cut dimmer. The input terminal of the phase-cut dimmer is connected to the live wire (the terminal L) of the alternating current power supply. The input terminal N of the high power factor phase-cut dimming power supply is connected to the zero line (the terminal N) of the alternating current power supply. The output terminal of the high power factor phase-cut dimming power supply is connected to the LED lamp or the LED light. The anti-interference circuit is connected to the input terminals L, N of the high power factor phase-cut dimming power supply. The anti-interference circuit is connected to the active power factor correction circuit, the dimmer current maintaining circuit, and the signal conversion circuit. The active power factor correction circuit is connected to the power conversion circuit. The signal conversion circuit is connected to the photoelectric coupler. The photoelectric coupler is connected to the PWM signal amplifying circuit. The PWM signal amplifying circuit is connected to a gate terminal of the field effect transistor. The positive terminal of the output of the power conversion circuit is the positive terminal of the output of the high power factor phase-cut dimming power supply. The negative terminal of the output of the power conversion circuit is connected to the source terminal of the field effect transistor. A drain terminal of the field effect transistor is the negative terminal of the output of the high power factor phase-cut dimming power supply. The active power factor correction circuit has functions of improving the power factor, reducing the interference to the electric network from the current harmonic content, and supplying the working voltage for the power conversion circuit. At the same time, the active power factor correction circuit works with the power conversion circuit to realize a high power, a small ripple. The output of the high power factor phase-cut dimming power supply works in a PWM control dimming mode. In the mode, the dimming effect is not affected by the load power. The mode also can achieve synchronous dimming when various LED lamps with different colors are connected. The mode can also improve the compatibility with the dimmer, because a signal dimmer current maintaining circuit is provided. The present invention is a high power factor phase-cut dimming power supply, which has advantages of a high power factor, a load power without any limitation, a high efficiency, an output power as high as several hundred watts (or even kilowatts), a low harmonic content, a high compatibility with the phase-cut dimmer or the silicon-controlled dimmer, and a small ripple.

DETAILED DESCRIPTION OF THE INVENTION

Figure 1:
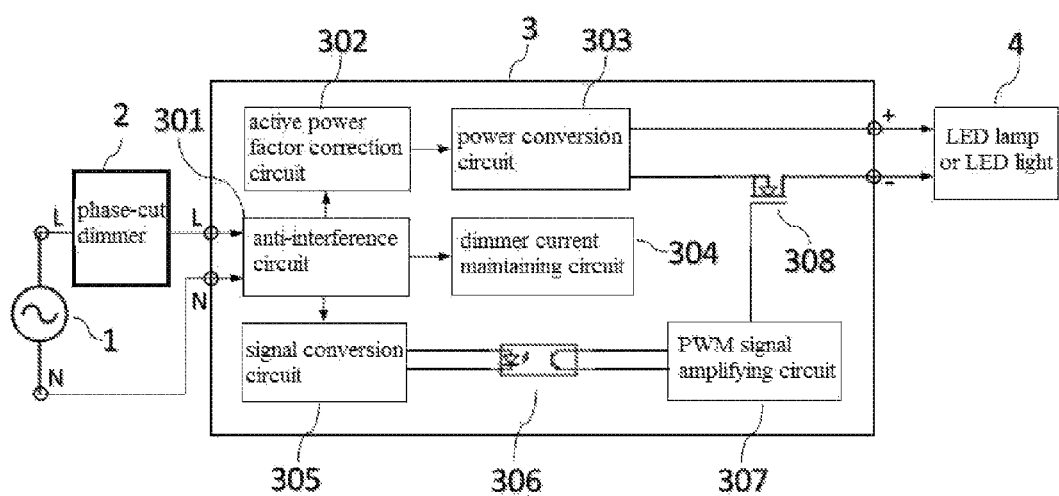
FIG. 1 is a structural block schematic diagram of the present invention.
Figure 2:
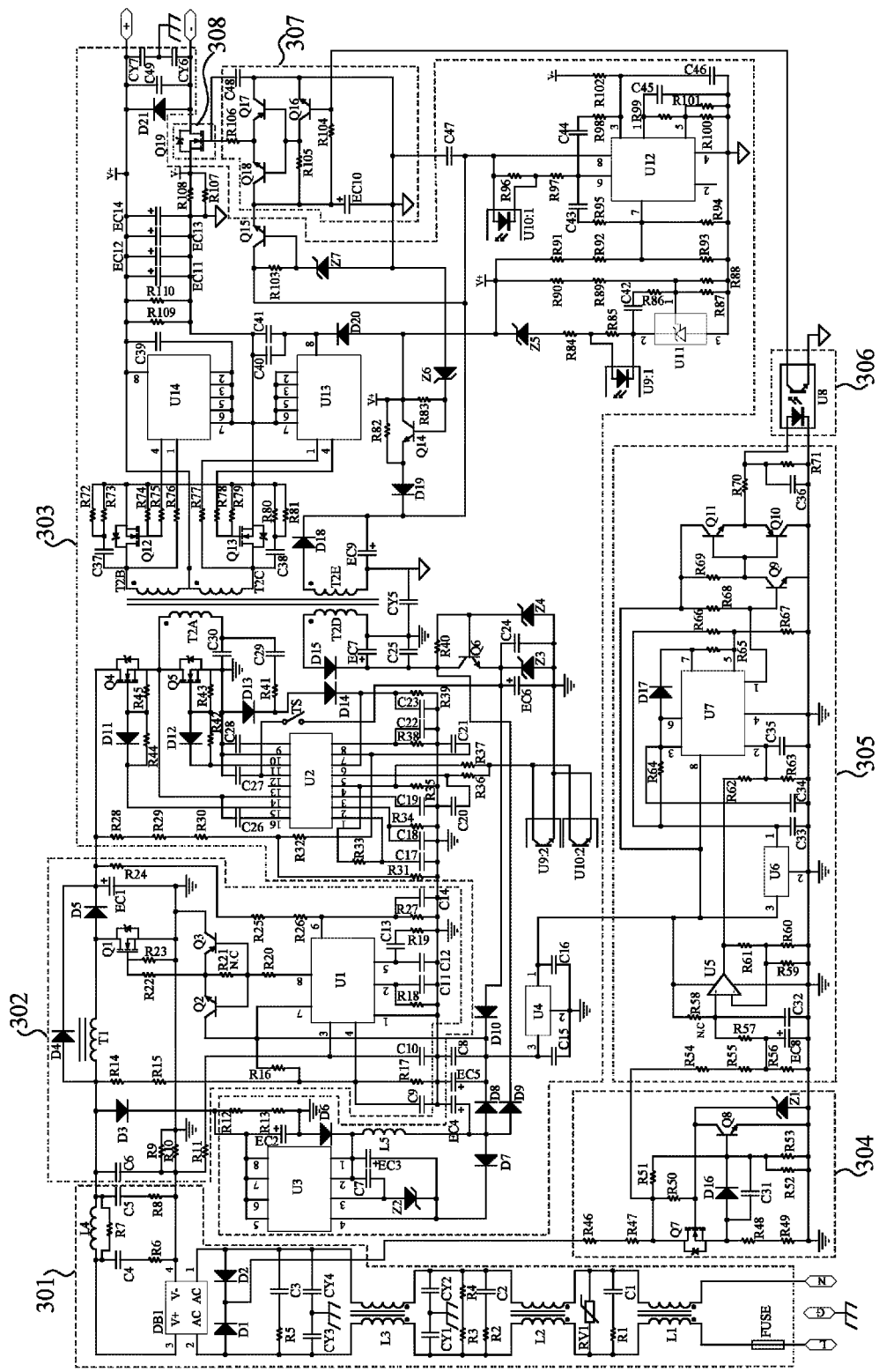
FIG. 2 is a schematic diagram of the circuit principle of the high power factor phase-cut dimming power supply provided by the present invention.

As show in FIG. 1 and FIG. 2, the present invention includes alternating current power supply 1, phase-cut dimmer 2, high power factor phase-cut dimming power supply 3, LED lamp, or LED light 4. The high power factor is defined as PF (power factor) ≥0.95. Alternating current power supply 1 is connected to the input terminal of phase-cut dimmer 2. The output terminal of phase-cut dimmer 2 is connected to the input terminal of high power factor phase-cut dimming power supply 3. The output terminal of high power factor phase-cut dimming power supply 3 is connected to LED lamp, or LED light 4. High power factor phase-cut dimming power supply 3 includes anti-interference circuit 301 that, active power factor correction circuit 302, power conversion circuit 303, dimmer current maintaining circuit 304, signal conversion circuit 305, photoelectric coupler 306, PWM signal amplifying circuit 307 and field effect transistor 308, and anti-interference circuit 301, active power factor correction circuit 302, power conversion circuit 303, dimmer current maintaining circuit 304, signal conversion circuit 305, photoelectric coupler 306, PWM signal amplifying circuit 307 and field effect transistor 308 adaptively connect with each other. The input terminal L of high power factor phase-cut dimming power supply 3 is connected to the output terminal of phase-cut dimmer 2. The input terminal of phase-cut dimmer 2 is connected to the live wire (the terminal L) of alternating current power supply 1. The input terminal N of high power factor phase-cut dimming power supply 3 is connected to the zero line (the terminal N) of alternating current power supply 1. The output terminal of high power factor phase-cut dimming power supply 3 is connected to LED lamp or LED light 4. Anti-interference circuit 301 is connected to the input terminals L and N of high power factor phase-cut dimming power supply 3. Anti-interference circuit 301 is connected to active power factor correction circuit 302, dimmer current maintaining circuit 304, and signal conversion circuit 305. Active power factor correction circuit 302 is connected to power conversion circuit 303. Signal conversion circuit 305 is connected to photoelectric coupler 306. Photoelectric coupler 306 is connected to PWM signal amplifying circuit 307. PWM signal amplifying circuit 307 is connected to a gate terminal of field effect transistor 308. The positive terminal of the output of power conversion circuit 303 is the positive terminal of the output of high power factor phase-cut dimming power supply 3. The negative terminal of the output of power conversion circuit 303 is connected to source terminal of field effect transistor 308. A drain terminal of field effect transistor 308 is the negative terminal of the output of high power factor phase-cut dimming power supply 3. Active power factor correction circuit 302 has functions of improving the power factor, reducing the interference to the electric network from the current harmonic content, and supplying the working voltage for power conversion circuit 303. Furthermore, active power factor correction circuit 302 works with the power conversion circuit 303 to realize a high power, a small ripple. The output of the high power factor phase-cut dimming power supply works in a PWM control dimming mode. In this mode, the dimming effect is not affected by the load power. This mode can also achieve synchronous dimming when various LED lamps with different colors are connected. This mode can also improve the compatibility with the dimmer, because a signal dimmer current maintaining circuit is provided.

In the embodiment, after being chopped by phase-cut dimmer 2, the alternating current of the alternating current power supply 1 is input to the input terminal of high power factor phase-cut dimming power supply 3. Then the alternating current is input to active power factor correction circuit 302 through anti-interference circuit 301. The active power factor correction circuit generally uses an active power factor correction circuit with boost regulation. Certainly, the active power factor correction circuit used in other modes is not restricted. The harmonic content can be reduced, the power factor is raised, and a constant working voltage for power conversion circuit 303 is provided through the active power factor correction circuit. A direct current with a constant voltage is output by power conversion circuit 303 through energy conversion. The direct current is supplied to the matched LED lamp or light 4 via field effect transistor 308. Power conversion circuit 303 can be a switching power supply with various known topological structures or topological structures of any invention in the future, such as topological structures including flyback, forward, LLC, LCC, half bridge, full bridge, etc., or improved topological structures. At the same time, the alternating current of alternating current power supply 1 chopped by phase-cut dimmer 2 is input to dimmer current maintaining circuit 304 and signal conversion circuit 305 through anti-interference circuit 301. A stable maintaining current is provided to phase-cut dimmer 2 by dimmer current maintaining circuit 304, to ensure the normal work of phase-cut dimmer 2, and improve the compatibility of high power factor phase-cut dimming power supply 3 and phase-cut dimmer 2. First, a resistor voltage division and a filtering conversion are conducted on the input alternating current by signal conversion circuit 305, to convert the input alternating current into a direct current signal with a low electrical level. The electrical level of the direct current signal is directly related to the average voltage or effective voltage of the alternating current input to high power factor phase-cut dimming power supply 3. That is to say, when the average voltage or effective voltage of the alternating current is changed, the voltage of the direct current signal converted by signal conversion circuit 305 can be changed. Therefore, the voltage of the direct current signal converted by signal conversion circuit 305 can be changed through changing the chopping depth of the alternating current by phase-cut dimmer 2. Then, the direct current signal is processed by signal conversion circuit 305 and converted into a PWM signal. The frequency of the PWM signal is fixed. The duty cycle, or pulse width of the PWM signal is determined by the electrical level of the direct current signal. The frequency of the PWM signal can be changed by setting the signal conversion circuit. The frequency will generally be set above 200 Hz, the purpose of which is to avoid feeling a flicker by the naked eyes, because the human eyes will feel a flicker in case the brightness-darkness switching period of the light is more than 5 millisecond (ms).

In an embodiment, signal conversion circuit 305 can be realized by a hardware circuit, such as a comparator, an amplifier, etc., and can also be realized by a microcontroller. The electrical level of the direct current signal is acquired by the signal conversion circuit using the microcontroller and then processed by the internal program, a PWM signal corresponding to the electrical level of the direct current signal can be output. The frequency of the PWM signal is set by the internal program of the microcontroller. Alternatively, signal conversion circuit 305 may include a phase inverting circuit to conduct phase inversion to the PWM signal and then the inverted PWM signal is output to photoelectric coupler 306. The inclusion of the phase inverting circuit depends on whether the phase of the PWM signal converted by signal conversion circuit 305 is opposite to the phase of the needed PWM signal. The PWM signal generated by signal conversion circuit 305 is input to photoelectric coupler 306, and transmitted to PWM signal amplifying circuit 307. The PWM signal is amplified by PWM signal amplifying circuit 307 and then input to the gate terminal of field effect transistor 308, to control switching on and off field effect transistor 308. Since the drain terminal of field effect transistor 308 is the negative terminal of the output of high power factor phase-cut dimming power supply 3, and the source terminal of field effect transistor 308 is connected to the negative terminal of power conversion circuit 303, switching on and off field effect transistor 308 controlled by the PWM signal is thus equivalent to switching on and off the output of high power factor phase-cut dimming power supply 3. Hence, the brightness of the LED lamp or light 4, which is connected to the output of high power factor phase-cut dimming power supply 3, is controlled. The frequency of switching on and off the output of high power factor phase-cut dimming power supply 3 and duty cycle are consistent with the frequency and duty cycle of the PWM signal, so that the brightness of the LED lamp or light 4 is determined by the duty cycle of the PWM signal. The high power phase-cut dimming power supply with a high power, a high power factor, a high efficiency, and a low harmonic wave is easily realized by means of active power factor correction circuit 302, and power conversion circuit 303 composed of a LCC circuit and a synchronous rectifier circuit.

In the embodiment, an alternating current signal is converted into a direct current signal, which is then converted into the PWM signal by signal converting circuit 305, which is composed of an operational amplifier and a comparison amplifier etc. The PWM signal is transmitted through photoelectric coupler 306 to PWM signal amplifying circuit 307 that is composed of transistors. Field effect transistor 308 is controlled by the amplified PWM signal through PWM signal amplifying circuit 307. Field effect transistor 308 controls the output of power conversion circuit 303, i.e., field effect transistor 308 controls the output of high power factor phase-cut dimming power supply 3. Application of PWM dimming control can solve the problem that the dimming effect is poor when the load power is less than 70% of the rated load power. It can also achieve synchronous dimming when the output of high power factor phase-cut dimming power supply 3 is connected to LED lamps with different colors. In some embodiments, signal conversion circuit 305 can also be realized by microcontrollers. The PWM signal amplifier can used transistors as an amplifier, Alternatively, some logic devices can also be used to reach the same effect. Besides, anti-interference circuit 301 shown in FIG. 2 also includes some bleeder circuits composed of resistors and capacitors. Those bleeder circuits not only can reduce the interference, but also can improve the compatibility of high power factor phase-cut dimming power supply 3 and phase-cut dimmer 2, especially the compatibility of high power factor phase-cut dimming power supply 3 and the trailing edge dimmer. Further, in cooperation with dimmer current maintaining circuit 304, the compatibility of high power factor phase-cut dimming power supply 3 with most of leading or trailing edge phase-cut dimmers 2 can be good. What is shown in FIG. 2 is just a preferred typical embodiment, and is only used for describing the present invention more specifically, and does not limit the scope of the present invention.

Compared to the prior art, the power factor is increased and the harmonic content is reduced in the present invention through the active power factor correction circuit 302, to well solve the problem of a low power factor and an interference to the network in the prior art. At the same time, the switching power circuit with a topological structure, such as LLC, LCC, forward, half bridge, full bridge etc. is used in power conversion circuit 303, to easily create a phase-cut dimming power supply with a small ripple, and a big power, so that the problem of a little power of the phase-cut dimming power supply in the prior art is solved. Particularly, the conversion efficiency is greatly high if the switching power circuit with a topological structure, such as LLC, LCC, forward, half bridge, full bridge etc., is used in power conversion circuit 303, and the overall efficiency of being above 90% is easily reached. In the present embodiment, the input alternating current signal is first converted into a direct current signal, which is then converted into a PWM signal by signal conversion circuit 305. The output of the present invention is controlled to realize dimming by applying the PWM signal, so that the problem of a bad dimming effect when the load power is smaller than 70% of the rated load power is well solved. Even when the load power is 1% of the rated load power, a good dimming effect can also be achieved. Hence, there is no limit for the load power. Besides, synchronous dimming can also be realized if the LED lamps with different colors are connected to the output. In the present invention, dimmer current maintaining circuit 304 can enhance the compatibility with phase-cut dimmer 2. The bleeder circuit of anti-interference circuit 301 can also enhance the compatibility with phase-cut dimmer 2. Therefore, the present invention provides a high power factor phase-cut dimming power supply, which has a very high compatibility with various kinds of phase-cut dimmers.

The above embodiments are just preferable embodiments of the present invention, and do not limit the scope of the present invention. All modifications, improvements, or replacements within the idea and content of the present invention all fall into the claimed scope of the present invention.

What is claimed is:

1. A high power factor phase-cut dimming power supply system, comprising an alternating current power supply, a phase-cut dimmer, a high power factor phase-cut dimming power supply, and an LED light;
    wherein the alternating current power supply is connected to an input terminal of the phase-cut dimmer, an output terminal of the phase-cut dimmer is connected to an input terminal of the high power factor phase-cut dimming power supply, an output terminal of the high power factor phase-cut dimming power supply is connected to the LED light; the high power factor phase-cut dimming power supply include an anti-interference circuit, an active power factor correction circuit, a power conversion circuit, a dimmer current maintaining circuit, a signal conversion circuit, a photoelectric coupler, a PWM signal amplifying circuit and a field effect transistor, and the anti-interference circuit, the active power factor correction circuit, the power conversion circuit, the dimmer current maintaining circuit, a signal conversion circuit, the photoelectric coupler, the PWM signal amplifying circuit and the field effect transistor adaptively connect with each other;
    wherein an input terminal L of the high power factor phase-cut dimming power supply is connected to the output terminal of the phase-cut dimmer, an input terminal of the phase-cut dimmer is connected to a terminal L of a live wire of the alternating current power supply, an input terminal N of the high power factor phase-cut dimming power supply is connected to a terminal N of the zero line of the alternating current power supply, an output terminal of the high power factor phase-cut dimming power supply is connected to the LED lamp or the LED light; the anti-interference circuit is connected with input terminals L and N of the high power factor phase-cut dimming power supply, the anti-interference circuit is connected to the active power factor correction circuit, the dimmer current maintaining circuit, and the signal conversion circuit; and
    wherein the active power factor correction circuit is connected to the power conversion circuit, the signal conversion circuit is connected to the photoelectric coupler, the photoelectric coupler is connected to the PWM signal amplifying circuit, the PWM signal amplifying circuit is connected to a gate terminal of the field effect transistor; a positive terminal of an output of the power conversion circuit is a positive terminal of an output of the phase-cut dimming power supply, a negative terminal of the output of the power conversion circuit is connected to a source terminal of the field effect transistor, a drain terminal of the field effect transistor is a negative terminal of the output of the high power factor phase-cut dimming power supply.

2. The high power factor phase-cut dimming power supply system according to claim 1, wherein the active power factor correction circuit has functions of increasing a power factor, reducing an interference of a harmonic content to an electric network, and supplying a working voltage to the power conversion circuit, wherein the active power factor correction circuit works with the power conversion circuit to realize a high power and a small ripple.

3. The high power factor phase-cut dimming power supply system according to claim 1, wherein the output of the phase-cut dimming power supply works in a PWM control dimming manner, so that a dimming effect is not affected by a load power, and a synchronous dimming is realized when various LED lamps with different colors are connected, wherein a compatibility with the phase-cut dimmer is improved due to the dimmer current maintaining circuit.

* * * * *